Patented May 3, 1927.

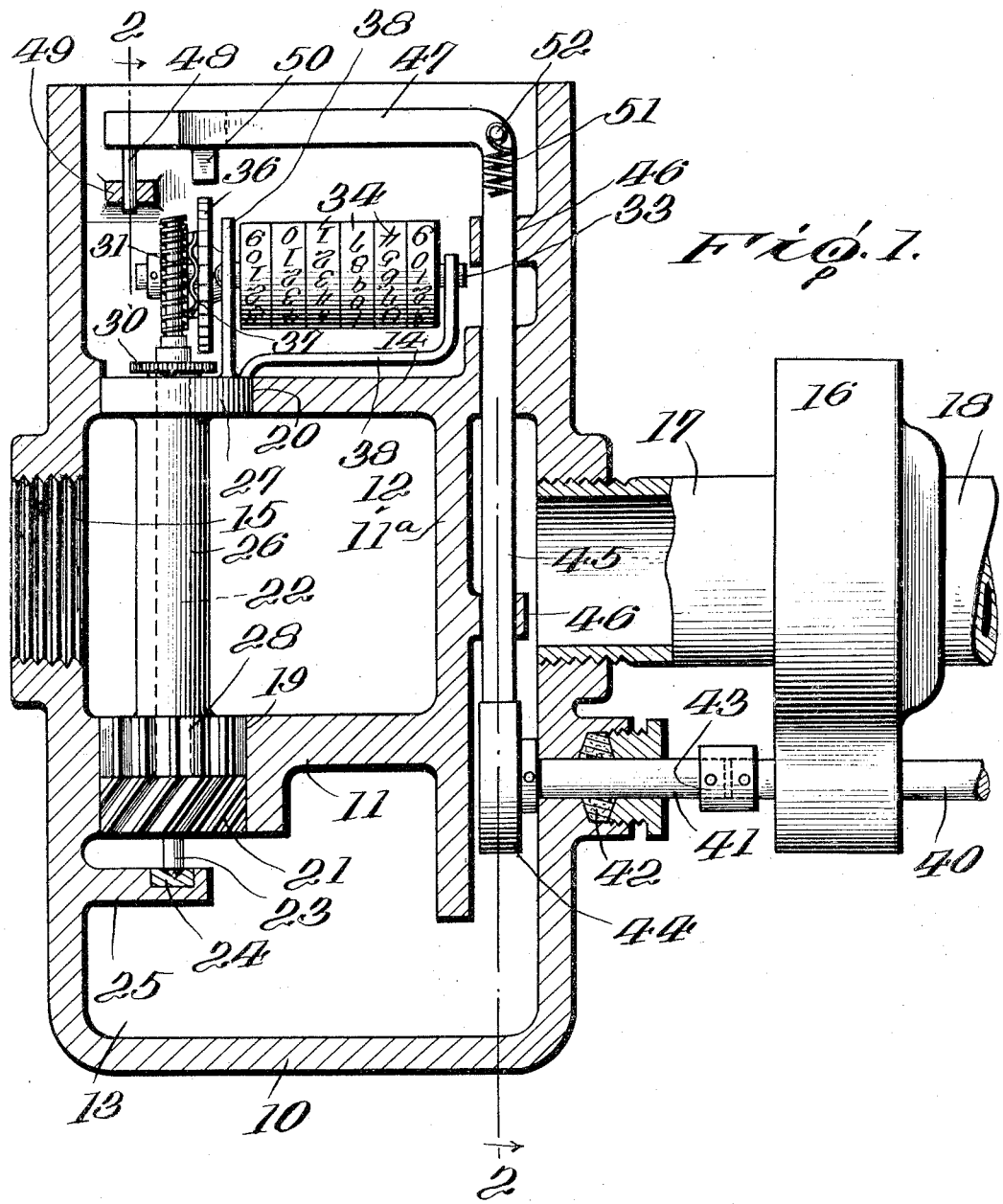

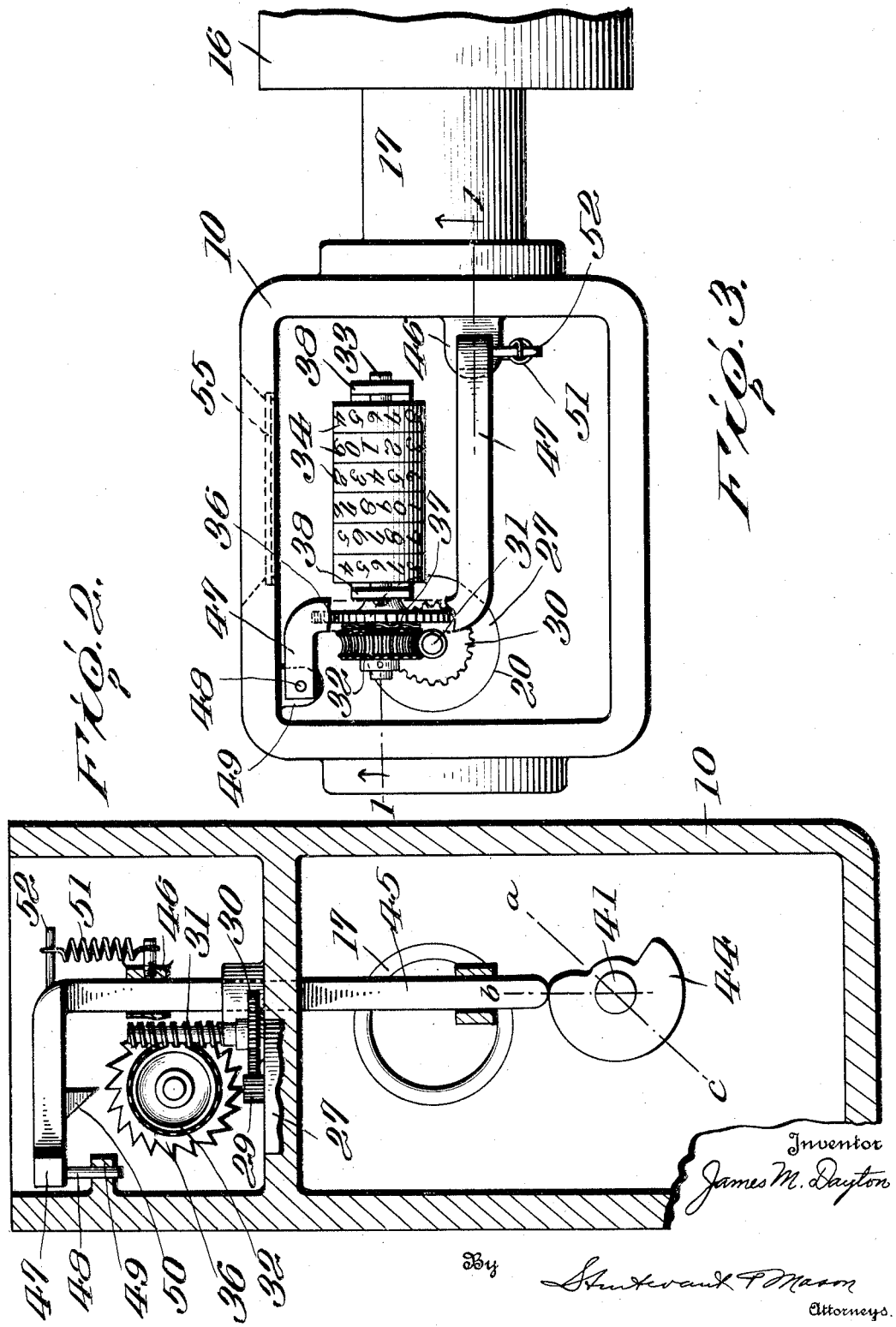

1,627,234

UNITED STATES PATENT OFFICE.

JAMES M. DAYTON, OF TORRINGTON, CONNECTICUT, ASSIGNOR TO THE DAYTON MANUFACTURING COMPANY, OF TORRINGTON, CONNECTICUT, A CORPORATION OF CONNECTICUT.

FLOW METER.

Application filed February 20, 1926. Serial No. 89,751.

This invention relates to improvements in flow meters, and more particularly to such devices for registering the flow from visible gasoline dispensing tanks.

It has heretofore been proposed to employ flow meters to indicate or register the volume of a liquid delivered: but such devices have either been constructed for volumetric operation instead of speed-of-flow, or have been inaccurate in their indications under the conditions of varying head, as is the case in dispensing liquids in varying quantities. Also, in dispensing liquids such as gasoline, the quantities delivered differ by exact integers of volumetric units except in rare cases of over-ordering and overflowing.

By the present invention, a flow turbine is caused to actuate a counting mechanism, and at the end of each delivery of integral quantities, the counting mechanism is moved to the correct registration of such quantity: and in event of overflowing of the automobile tank in the case of gasoline or like dispensing apparatus, the closing of the delivery pipe by its valve will cause the counting mechanism to indicate the next higher unit of delivery, which is the correct one in the trade since such liquids are dispensed by unit volumes and not by fractions.

One form of execution of the present invention is set forth on the accompanying drawings in which:

Figure 1 is a section through the flow meter, substantially on line 1—1 of Fig. 3.

Fig. 2 is a section through the flow meter substantially on line 2—2 of Fig. 1.

Fig. 3 is a plan view, with the cover removed and part of the pawl rod broken away for greater clearness.

A gasoline dispensing apparatus is according to this invention constructed with a buried supply tank, a manual feeding pump which sucks the gasoline from the buried, low level tank and delivers it by integral multiples of a unit volume into a high level visible tank, e. g. in quantities of 1, 2, 3 . . . 10 gallons as ordered by the customer, who by inspection of the visible tank may determine that his order is ready for completion. The delivery hose nozzle is then applied to the filling pipe of the automobile fuel tank, and a control gate valve is opened. The gasoline now flows by gravity through the opened gate valve into the automobile tank until the high level visible tank is drained. During this flow, the gasoline actuates a turbine which actuates a counting mechanism in proportion to its own movement. Since the head or level of liquid is constantly diminishing, the turbine moves at a gradually decreasing speed during delivery, for example, of ten gallons. If only one gallon is to be delivered, the speed of the turbine at the beginning is only that which it has when nine out of ten gallons have been delivered. This variation of speed gives rise to the error set forth above.

According to the particular illustration, the flow meter comprises the casing 10 having an intermediate partition 11 to define the chambers 12 and 13, the latter being closed at the top by a partition wall 14. The delivery pipe from the high level tank is connected to the meter front casing by the screw threads 15 to deliver gasoline into the chamber 12; and a gate valve 16 is connected to the outlet side of the casing by a short length of pipe 17; and delivers the liquid from the chamber 13 through the discharge pipe 18 to the automobile. The partition 11 within the casing is continued upwardly by the wall 11ª to join the partition 14. An aperture 19 is present in the partition 11. A similar aperture 20 is provided in the partition 14.

The operative elements of the flow meter comprise the turbine wheel 21 which is carried by a shaft 22 and is supported at its bottom by the shaft pin 23 which turns on a bearing plate 24 mounted in the inwardly projecting bracket 25 of the casing 10. The shaft for its greater length passes within the sleeve 26 which is formed integrally with an upper closing plate 27 which fills the aperture 20 in the partition 14; the gasoline is excluded from the chamber containing the counting mechanism by reason of its being an air-tight chamber, sealed by the closing cap (not shown). At its lower end, the sleeve 26 has the stationary guide blades 28 to deliver the liquid within the chamber 12 to the moving blades of the turbine 21 in a proper direction.

The liquid entering through the pipe connected to the screw threads 15 passes into the chamber 12, downwardly through the passages of the stationary blade 28, strikes the moving blades of the turbine 31 and rotates the same, and escapes therefrom into the chamber 13, from which it is discharged by the pipe 17, the gate valve 16 and discharge pipe 18.

The upper end of the shaft 22 carries a small pinion 29 which meshes with the large gear 30. This gear 30 in turn carries the worm 31, which engages with the worm wheel 32 which is mounted loosely upon the shaft 33 of a counting mechanism which has the loose indicator disks 34 of usual type therein and with the usual transfer elements between the units, tens, hundreds, etc. A ratchet wheel 36 is disposed upon this same shaft and in driving connection with the first or "units" disk, for example, but is free of the shaft and of the worm gear 32. A friction spring washer 37 is located between the worm wheel 32 and the ratchet wheel 36, so that as long as the ratchet wheel 36 is free to move, it is positively driven by the worm gear 32, and hence according to the rotations of the turbine wheel 21. The disk 27 has formed integrally therewith the brackets 38 which support the axis 23 of the counter mechanism.

The operating shaft 40 of the gate valve 16 has an extension 41 which passes through the packing 42 of the casing 10, and the two shafts are associated together by the bushing 43. The inner end of the shaft 41, within the casing 10, carries a cam 44, which as shown in Fig. 2, has a quick rise between the parts of its surface designated by the radial lines a and b, and then has a dwell on its surface between the portion included between the radial lines b and c, so that at the first movement of the gate handle, the cam 44 is caused to exert a quick upward movement upon the pawl rod 45, and thereafter to hold it in invariable raised position. It will be understood that during this first initial movement, the gate valve 16 is not actuated by its handle 40.

The pawl rod 45 is guided by the brackets 46 which are formed on the casing and its partition walls and by the partition wall 14. The upper end of the rod 45 is bent in a horizontal direction as shown at 47, and carries at its far end the pin 48 which serves as a guide in connection with a bracket 49 of the casing 10. At an intermediate point of the length of the arm 47 is disposed pawl 50 which may be formed integrally with this arm, and which is held opposite the ratchet wheel 36. A return spring 51 is fastened between the pin 52 on the members 45, 47 and one of the brackets 46 of the casing, to constantly urge the rod and arm downwardly.

When the gate valve is entirely closed, the cam 44 will present itself substantially along the radial line a beneath the pawl rod 45, so that the latter may be forced downwardly, by its spring 51, and thereby moves the pawl 50 into engagement with the ratchet wheel 36. An exact quantity of gasoline such as one, two, three, etc. gallons is then measured into a high level tank, as set forth hereinbefore. Apparatus to accomplish this and the tank are old and well known in the art and form no part of the present invention, and therefore have not been illustrated on the drawings. Suffice it to say that an autoist orders gasoline by the exact gallon. This quantity is then pumped into a high level tank and the operator moves the gate valve shaft 40 to open the gate valve. Before the gate valve opens, the pawl 50 is raised out of engagement with the ratchet 36 by the action of the cam 44 and the rod 45 in the manner set forth above. The gate valve then opens. The gasoline may now flow on the course indicated heretofore from the high level tank and into the chamber 12, thence to the chamber 13, and after passing the valve 16 will be discharged through the pipe 18 into the automobilist's fuel tank on the automobile. The exact quantity of gasoline is of course determined by the quantity contained in the high level tank.

As the gasoline flows through the turbine 21, the shaft 22 is rotated in proportion to the movement of the turbine, and therewith the counting mechanism is actuated by the frictional engagement between the worm wheel 32 and the ratchet wheel 36 effected by the friction device 37. It will be understood, however, that the "head" existing upon the turbine varies according to the quantity of gasoline to be delivered; if 10 gallons are to be delivered, the head is sufficiently greater than the head at one gallon delivery to afford a volume in the high level tank for nine gallons. It is furthermore known that turbine devices operate at different speeds depending upon the head, regardless of the actual volume of liquid passed. It is therefore apparent that the registration between ten gallons and nine gallons will be greater than the registration between the one gallon and the zero mark of the high level tank.

Since the gasoline is dispensed in quantities of exactly one gallon with the exception of the rare case where too much gasoline has been ordered by the autoist and a portion overflows, it is obvious that some means must be employed to correct the reading determined by the difference in head upon the turbine. For this purpose, the gate valve is closed as usual after the full quantity has been delivered from the high level tank into the automobile tank. In closing, the flow is shut off, so that the turbine 21 comes to a standstill, and then by a further rotation of the gate valve shaft, the cam 44 permits the pawl rod 45 to drop and to bring the pawl 50 into engagement with the ratchet wheel 36 beneath it. The contact of the inclined surfaces of pawl and ratchet tooth will cause the ratchet wheel to be moved into the exact registration next ahead. In other words, if in delivering one gallon to an automobile, the turbine 21, by reason of the low head existing at such small volume of delivery, merely indicates 0.98 gallons or an error of 2%, the pawl will come down and move the ratchet wheel a sufficient distance to bring the same into the position in which it would have been if the turbine had moved for an indication of exactly 1.0 gallons.

It is preferred in practice to construct the turbine to run at less than correct speed, so that the maximum delivery is slightly under-registered for correction by the pawl. For example the turbine may vary from ¼ to 5 percent below correct speed, since 5 percent of ten gallons is ½ gallon, or the value of one ratchet tooth.

It will be understood that the under-registration, the drop of turbine speed for varying heads, and the number of teeth in the ratchet wheel bear such a relation to each other that each ratchet tooth is able to correct the total deviation from absolute accuracy, regardless of whether occasioned by under-regulation or drop of speed due to lowered head of pressure. For example, if the turbine has a total maximum error of 2 percent, 50 teeth may be employed, each representing one-fifth of a gallon on a ten gallon apparatus.

In case that the gasoline should overflow from the automobilist's tank, the gate valve may be shut, and the registration will then be correct to the next indication as determined by the number of teeth on the ratchet wheel. In the particular illustration shown, which is presumed to be for a high level tank having a maximum capacity of exactly ten gallons, a ratchet wheel 36 of twenty teeth is employed, so that every time the pawl 50 comes down, it will move the ratchet wheel to the next higher or one-half gallon registration.

From time to time, the counting mechanism may be read through the window 55 in the side of the casing 10, to determine the quantity of gasoline dispensed.

In order to assure at all times a relatively large flow of gasoline through the turbine, so that the latter will always work under a large percentage of the maximum flow, the gate valve is preferably constructed for quick opening to say one-fourth aperture, and for quick closing from one-fourth aperture, so that the valve when open is always at least one-fourth open.

In use, a cover is placed over the counting mechanism compartment, to exclude dirt, and seal the chamber containing the counting mechanism against entrance of gasoline.

The invention is obviously not limited to the particular embodiment or application shown, but may be modified within the scope of the appended claims.

What is claimed as new is:

1. In a flow meter, a conduit for a liquid, a shut-off valve on said conduit, a counting mechanism and means actuated by the flow of liquid in said conduit to drive the counting mechanism, the combination therewith of a device to correct the registration of said mechanism, and means controlled by said shut-off valve to actuate said device.

2. The combination with the counting mechanism of a flow meter for liquids passing through a valve-controlled conduit wherein the flow meter causes varying registrations of the mechanism for given equal volumes according to the head of liquid, a device to cause said mechanism to move from a fraction registration to the next higher integer registration, and means controlled by said valve to actuate said device.

3. The combination with the counting mchanism of a flow meter actuated by liquids passing through a conduit having associated therewith an instrumentality whereby to render the flow of the liquid through the conduit intermittent, the flow meter producing varying registrations of the mechanism for given equal volumes, of a device to move said mechanism from a fraction registration to the next higher integer registration, and means controlled by said instrumentality and operating during the cessation of liquid flow to actuate said device.

4. The combination with a counting mechanism coupled for operation by an apparatus driven by the flow of liquid through a valve-controlled conduit, wherein said apparatus makes varying numbers of revolutions for given equal volumes of a ratchet wheel coupled to said mechanism to move therewith, a pawl rod controlled by the operating mechanism of the valve so that it moves operatively while the valve aperture is closed, and a pawl on said rod adapted to move said ratchet wheel and mechanism during said operative movement thereof from a fraction registration to the next higher integer registration.

5. The combination with a counting mechanism and an apparatus driven by the flow of liquid through a valve-controlled conduit, wherein said apparatus is driven varying numbers of revolutions by equal given volumes of liquid; of a frictional driving connection between said apparatus and said mechanism, a ratchet wheel positively connected for rotation with said mechanism, a pawl rod actuated from the valve mechanism after the aperture thereof is closed, and a pawl actuated by said rod to advance said ratchet wheel and counting mechanism independently of the drive by said apparatus whereby to advance said counting mechanism from a fraction registration to the next higher integer registration.

6. The combination with a counting mechanism, a valve-controlled conduit for liquids to be metered, and an apparatus driven by the flow of liquid in said conduit by varying numbers of revolutions for given equal volumes of liquid, of a flow driving connection and an intermittent driving connection for said counting mechanism, said flow driving connection being actuated by said apparatus during the flow of liquid, and a device actuated upon the cessation of flow of liquid to actuate said intermittent connection whereby to move said counting mechanism from a fraction registration to the next higher integer registration.

7. In a liquid dispensing system, the combination with a high level tank, means to place predetermined integer and multiple integer volumes of liquid in said tank to establish varying respective levels therein, a discharge conduit having a shut-off valve therein, a counting mechanism, and an apparatus driven by the flow of liquid through the discharge pipe for numbers of revolutions approximating a linear proportion to the volumes of liquid but less than the same by an error resulting from the difference of head by reason of the varying liquid level in said tank, said apparatus driving said mechanism; of an actuating device to move said mechanism from the erroneous fraction registration to the correct integer registration, and means controlled by said valve in closing following a complete discharge of the predetermined volume of liquid in said tank to actuate said device.

In testimony whereof, I affix my signature.

JAMES M. DAYTON.